US012564989B2

(12) United States Patent
Connolly et al.

(10) Patent No.: US 12,564,989 B2
(45) Date of Patent: Mar. 3, 2026

(54) TRANSFER MOLDING SYSTEM AND METHODS

(71) Applicant: KUKA Systems North America LLC, Sterling Heights, MI (US)

(72) Inventors: Brian E. Connolly, Macomb, MI (US); Corey Michael Buczek, Flushing, MI (US)

(73) Assignee: KUKA Systems North America LLC, Sterling Heights, MI (US)

( * ) Notice: Subject to any disclaimer, the term of this patent is extended or adjusted under 35 U.S.C. 154(b) by 63 days.

(21) Appl. No.: 18/645,991

(22) Filed: Apr. 25, 2024

(65) Prior Publication Data

US 2025/0332771 A1 Oct. 30, 2025

(51) Int. Cl.
B29C 45/02 (2006.01)
B29L 31/00 (2006.01)

(52) U.S. Cl.
CPC ....... B29C 45/02 (2013.01); *B29L 2031/7498* (2013.01)

(58) Field of Classification Search
CPC .............. B29C 45/045; B29C 45/0441; B29C 2045/022; B29C 45/06; B29C 2043/5084; B29C 2043/3466; B29C 43/08; B29C 2043/046; B29C 45/021; B29C 45/02
USPC ......................................... 264/272.19, 272.2
See application file for complete search history.

(56) References Cited

U.S. PATENT DOCUMENTS

| | | | | |
|---|---|---|---|---|
| 1,858,870 A | * | 5/1932 | Apple ...................... | H02K 3/44 |
| | | | | 310/43 |
| 1,934,903 A | * | 11/1933 | Apple .................... | H02K 15/12 |
| | | | | 310/43 |
| 4,845,837 A | * | 7/1989 | Lloyd .................... | H02K 1/276 |
| | | | | 310/43 |
| 2004/0208647 A1 | * | 10/2004 | Gill .................... | H04B 10/5563 |
| | | | | 398/188 |
| 2004/0212128 A1 | * | 10/2004 | Balboni ................ | B29C 31/048 |
| | | | | 425/511 |
| 2005/0031723 A1 | * | 2/2005 | Zoppas ................... | B29C 43/08 |
| | | | | 425/348 R |
| 2006/0103253 A1 | * | 5/2006 | Shiga ..................... | H02K 15/03 |
| | | | | 310/43 |
| 2007/0001338 A1 | * | 1/2007 | Mattice ................... | B29C 43/34 |
| | | | | 264/141 |
| 2008/0063886 A1 | * | 3/2008 | Kitano ................... | B29C 31/048 |
| | | | | 264/331.12 |
| 2008/0268274 A1 | * | 10/2008 | Parrinello ............. | B29C 31/048 |
| | | | | 425/112 |
| 2008/0276446 A1 | * | 11/2008 | Amano ............. | B29C 45/14778 |
| | | | | 29/598 |

(Continued)

FOREIGN PATENT DOCUMENTS

WO 2023033252 A1 3/2023

*Primary Examiner* — Matthew J Daniels
(74) *Attorney, Agent, or Firm* — Dorton & Willis, LLP

(57) ABSTRACT

A transfer molding system includes a plurality of resin receptacles selectively movable by a resin support into registration with a first actuator for dispensing resin material through a transfer manifold and into a component core. Two or more component cores are supported on a core support for selective movement to a position for receiving resin material dispensed through the manifold. The resin receptacles and manifold may be controllably heated to melt the resin material and maintain temperatures to facilitate resin transfer into the component cores.

7 Claims, 7 Drawing Sheets

(56) References Cited

U.S. PATENT DOCUMENTS

| | | | | |
|---|---|---|---|---|
| 2008/0277830 A1* | 11/2008 | Balboni | ............... | B29C 31/048 |
| | | | | 425/352 |
| 2011/0045115 A1* | 2/2011 | Zuffa | ..................... | B29C 43/34 |
| | | | | 414/222.01 |
| 2014/0167318 A1* | 6/2014 | Forsthovel | ............. | B29C 45/27 |
| | | | | 264/297.3 |
| 2019/0105817 A1* | 4/2019 | Yomoda | .................. | B29C 45/02 |
| 2019/0315027 A1* | 10/2019 | Sugiyama | ............... | B29C 45/14 |
| 2023/0068378 A1* | 3/2023 | Aldigeri | ................. | B29C 43/50 |
| 2023/0219264 A1* | 7/2023 | Pucci | ..................... | B29C 43/34 |
| | | | | 264/148 |

* cited by examiner

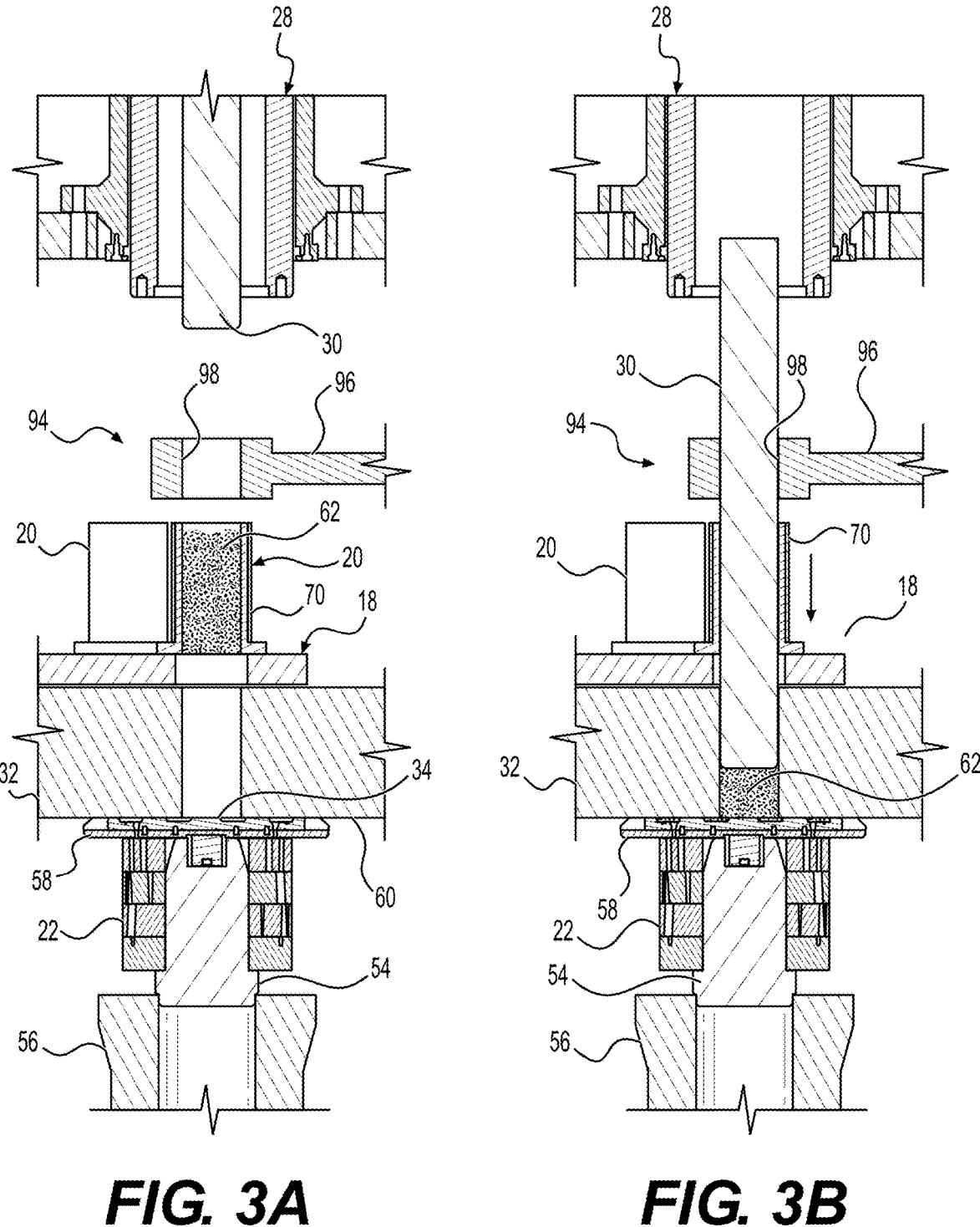
FIG. 3A          FIG. 3B

20

70

72

TRANSFER MOLDING SYSTEM AND METHODS

TECHNICAL FIELD

The present invention relates generally to systems and methods for manufacturing molded parts, and more particularly to improved systems and methods for transfer molding parts.

BACKGROUND

Various products and components parts are manufactured by molding operations wherein molten plastic material is transferred into a mold for forming a part, or into a component part having cavities that are filled with the molten plastic material. In one exemplary application, rotor cores for interior permanent magnet (IPM) motors are formed by securing a plurality of permanent magnets at positions circumferentially spaced around a generally cylindrical rotor core body. Conventionally, the permanent magnets are held in place within cavities formed in the rotor core body by adhesives, or by molten resin that has been transferred into the cavities and allowed to solidify. Conventional methods for forming rotor cores of IPM motors involve placing an unfilled rotor core into a transfer molding machine, wherein the rotor core has permanent magnets positioned within cavities adapted for receiving the permanent magnets. Molten resin is then transferred into the cavities to thereby secure the magnets in position, and the filled rotor core is removed for subsequent handling and/or processing.

Such conventional methods for manufacturing IPM rotor cores are time-consuming because the individual rotor cores must be successively loaded and unloaded from a transfer molding machine. Moreover, because the resin materials used to fill the cavities of the rotor cores are thermoset materials, difficulties and inefficiencies arise with respect to the need to properly heat the resin material and time the transfer of molten resin material into a waiting rotor core without scorching the resin material. To avoid scorching, heating of the resin material is often only begun once an unfilled rotor is ready to be filled, resulting in excessively long cycle times. There is a need for improved transfer molding systems and methods that overcome these and other drawbacks of conventional transfer molding of parts and components of parts.

SUMMARY

The present invention provides a transfer molding system that automatically and efficiently controls the heating and supply of resin material for filling component cores that are automatically moved into and out of a position for receiving resin material. While the invention will be described in connection with one or more embodiments, it will be understood that the invention is not limited to these embodiments. On the contrary, the invention includes all alternatives, modifications, and equivalents as may be included within the spirit and scope of the present invention.

In one embodiment, a transfer molding system in accordance with the principles of the present disclosure incudes a first actuator for transferring molten resin into a component core, and a resin support supporting a plurality of resin receptacles. The resin support selectively moves respective resin receptacles to and from a first position for operative engagement with the first actuator, and at least one second position displaced away from the first position. A transfer manifold adjacent the resin support is adapted to receive resin from a resin receptacle located at the first position when the first actuator is actuated to operatively engage the resin receptacle. The transfer manifold includes at least one outlet for dispensing resin into an unfilled component core. The system further includes a core support positioned near the transfer manifold and supporting at least two component cores for movement to and from a first index location wherein a respective component core is aligned with the at least one outlet of the transfer manifold, and at least one second index location wherein the component core is displaced away from the first index location for handling or processing. A second actuator aligned with the first index location of the core support is operable to move a respective component core at the first index location from a first position supported on the core support, to a second position raised from the core support and in operative engagement with the at least one outlet of the transfer manifold, whereby resin may be transferred from the transfer manifold into the component core.

In one aspect, one or both of the resin support or core support may be configured as rotationally indexable tables. In another aspect, the resin receptacles may be resin pots, and may include associated heating devices configured to heat resin material received within the resin pots. Heating of the resin material may thereby be controlled in coordination with movement of the resin pots and component cores to positions for transferring molten resin material from the resin pots and into the component cores. A transfer molding system in accordance with the principles of the present disclosure may further include a vacuum assembly for cleaning excess resin material or other debris from a surface of the transfer manifold proximate the at least one outlet.

In another aspect, a method for filling a component core with resin includes receiving an unfilled component core on core support at a first index location, moving the unfilled component core on the core support from the first index location to a second index location aligned with an outlet, transferring molten resin through the outlet and into a cavity in the component core, and moving the filled component core on the core support away from the second index location.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

FIGS. 3 and 3B are cross-sectional schematic views illustrating operation of the transfer molding system to transfer molten resin material into a component core.

DETAILED DESCRIPTION

Figure 1:
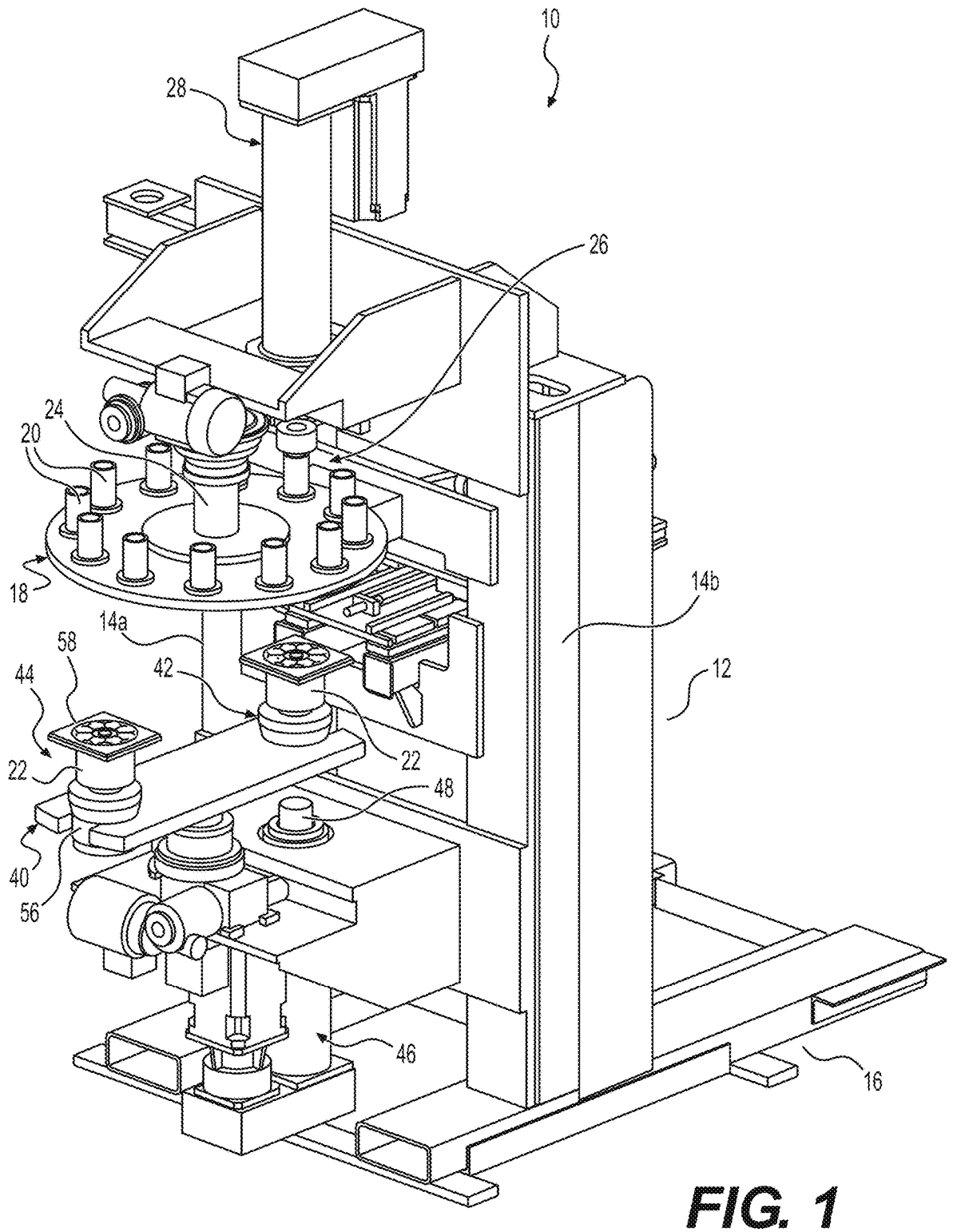
FIG. 1 is a perspective view illustrating an exemplary transfer molding system in accordance with the principles of the present disclosure.
Figure 2A:
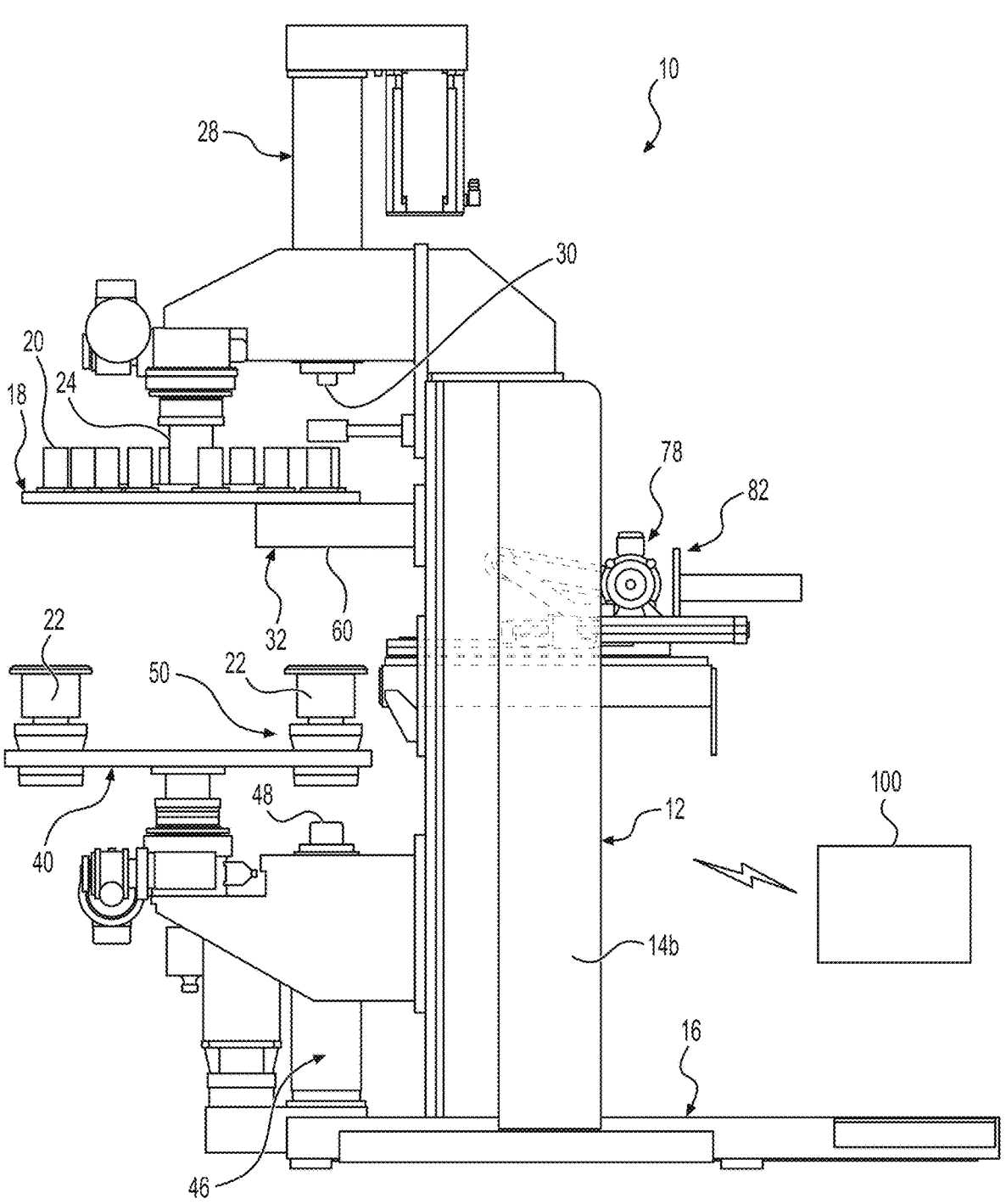
FIG. 2A is a side elevation view of the transfer molding system of FIG. 1 in a first configuration.

FIG. 1 is a perspective view of an exemplary transfer molding system 10 in accordance with the principles of the present disclosure. With reference to FIGS. 1 and 2A, the transfer molding system 10 includes a structural frame 12 that supports the various components of the transfer molding system 10 discussed in more detail herein. In the embodiment shown, the frame 12 includes first and second vertical members 14a, 14b extending generally upwardly from a floor-mounted base 16. A resin support 18 is mounted on the frame 12 and is configured to support one or more resin receptacles 20 thereon. In the embodiment shown, the resin receptacles 20 are in the form of resin pots that are sized and configured for receiving a predetermined volume of solid resin material. The resin pots 20 may be controllably heated to melt the solid resin material to facilitate transferring the resin material into a component core 22. In the embodiment shown, the resin support 18 is in the form of a rotationally indexable table coupled with the frame 12 by a shaft 24, whereby the resin support 18 may selectively controlled to move the respective resin receptacles 20 sequentially to and from a first position 26 in registration for operative engagement with a first actuator 28 adapted for transferring the resin material contained within the resin receptacle 20, and one or more second positions spaced away from the first position. In the embodiment shown, the first actuator 28 is supported on the frame 12 at a position above the resin support 18 and includes a first piston 30 that can be actuated to extend downwardly to engage a resin receptacle 20 at the first position 26.

With continued reference to FIGS. 1 and 2A, and referring further to FIGS. 3A-3B, the transfer molding 10 system further includes a transfer manifold 32 positioned directly below the resin support 18 and configured for receiving resin material from the respective resin receptacles 20 after the resin receptacles 20 are moved into the first position 26. The transfer manifold 32 may be controllably heated in order to maintain a desired temperature of the molten resin received from the respective resin receptacles 20. Molten resin is forced from the respective resin receptacles 20 by the first actuator 28, through the transfer manifold 32, and then dispensed from at least one outlet 34 of the transfer manifold 32.

The transfer molding system 10 further includes a core support 40 supported on the frame 12 beneath the transfer manifold 32. The core support 40 is configured to support at least two component cores 22 for movement to and from a first index location 42 aligned with the at least one outlet 34 of the transfer manifold 32, and at least one second index location 44 where the component core 22 is displaced away from the first index location 42 so that it can be handled or processed, or replaced with a subsequent, unfilled component core 22. In the embodiment shown, the core support 40 comprises an index table that is rotatably supported on the frame 12, whereby rotation of the index table moves component cores 22 supported thereon to and from the first index location 42 and the one or more second index locations 44. The resin support 18 and core support 40 may comprise Model RTF650 Servo Rotary Index Tables available from Motion Index Drives of Troy, MI.

Figure 2B:
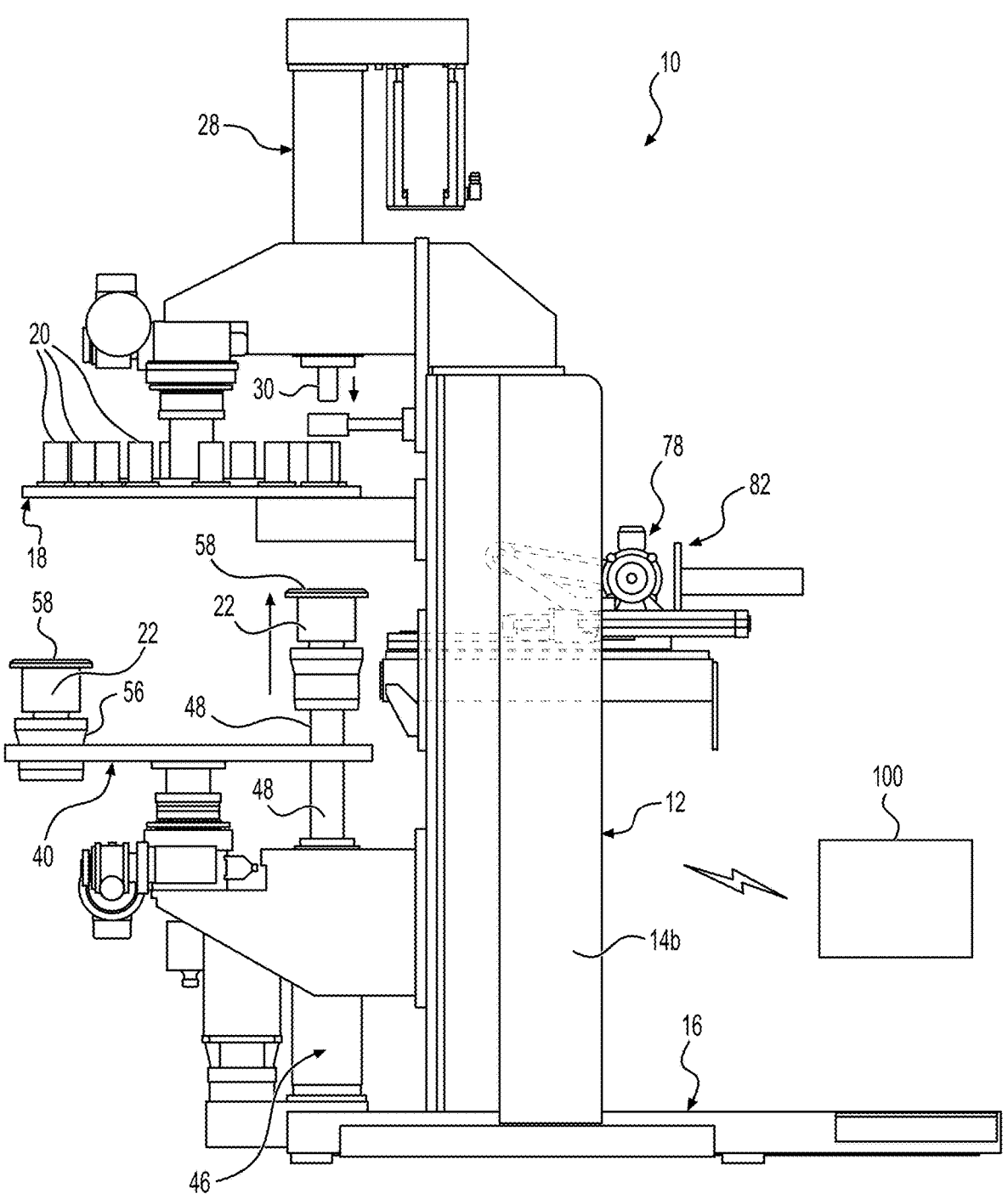
FIG. 2B is a side elevation view of the transfer molding system of FIG. 1, illustrating operation of the transfer molding system.
Figure 2C:
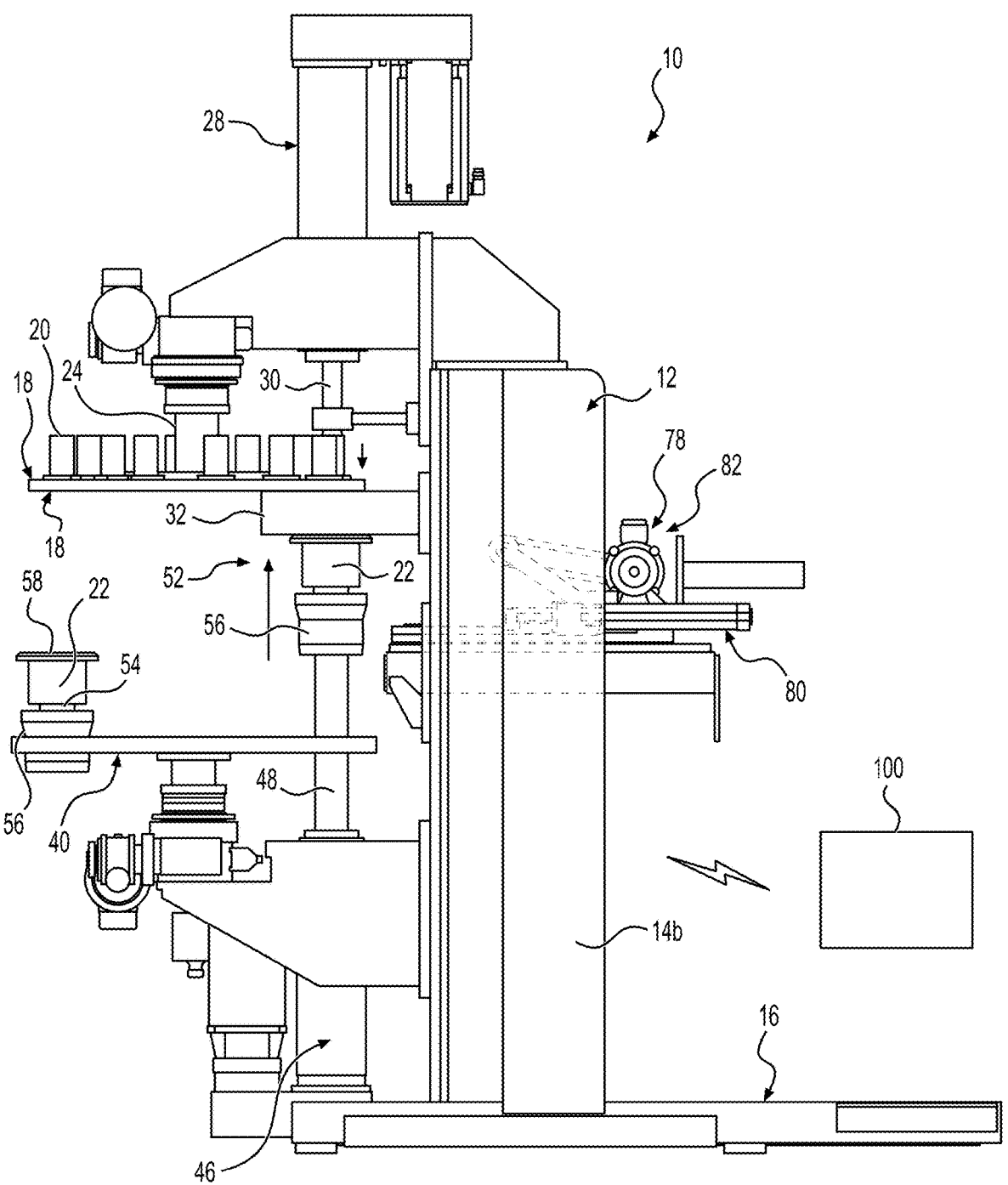
FIG. 2C is a side elevation view of the transfer molding system of FIG. 1, illustrating further operation of the transfer molding system.

With additional reference to FIGS. 2B-2C, a second actuator 46 is supported on the frame 12 generally beneath the core support 40 and at a position aligned with the first index location 42 of the core support 40. The first and second actuators 28, 46 may comprise 30 kN and 300 kN EMPA Servo Presses, respectively, available from Promess, Inc. of Brighton, MI. In the embodiment shown, the second actuator 46 comprises a second piston 48 that may be extended in an upward direction to engage a component core 22 supported on the core support 40 at the first index location 42, whereby the second actuator 46 raises the component core 22 from a first position 50 supported on the core support (FIG. 2A) to a second position 52 operatively engaged with the at least one outlet of the transfer manifold (FIG. 2C). When an unfilled component core 22 is in the second position 52 and operatively engaged with the at least one outlet 34 of the transfer manifold 32, the first actuator 28 may be actuated to extend the first piston 30 downwardly to engage a resin receptable 22 located at the first position 26, thereby transferring molten resin 62 from the resin receptacle 22 and through the transfer manifold 32, whereafter the molten resin 62 is dispensed from the at least one outlet 34 and into the component core 22.

In the embodiment shown, the component cores 22 are rotor cores for an interior permanent magnet (IPM) motor, each of which is supported on a mandrel 54 of a core tooling 56 adapted to be received on the core support 40. The core tooling 56 may include a runner plate 58 that can be fitted to an upper end of an unfilled rotor core 22 to facilitate transferring resin into cavities formed within the rotor core 22. Accordingly, as the second actuator 46 extends to raise a component core 22 positioned at the first index location 42, the second piston 48 engages the core tooling 56 and raises the tooling 56 with an unfilled rotor core 22 supported thereon such that the runner plate 58 engages the lower surface 60 of the transfer manifold 32, as depicted in FIGS. 2B-2C. Molten resin 62 may then be dispensed from the at least one outlet of the transfer manifold and received into the cavities of the rotor core 22 through the runner plate 58.

While a transfer molding system 10 in accordance with the principles of the present disclosure is shown and described herein in an embodiment configured for use in manufacturing rotor cores of IPM motors, it will be appreciated that a transfer molding system 10 in accordance with the principles of the present disclosure may alternatively be used to fill various other types of component cores, or to make various other types of molded parts. Moreover, while the resin support 18 and core support 40 have been shown and described herein as rotary index tables, it will be appreciated that the resin support 18 and/or core support 40 of a transfer molding system 10 in accordance with the principles of the present disclosure may comprise various other structure suitable for selectively moving resin receptacles 20 or component cores 22 into positions for transferring molten resin 62 from a resin receptacle 20 to fill a component core 22. For example, one or both of the resin support 18 or core support 40 may be configured as structure adapted to linearly shuttle the respective resin receptacles 20 or component cores 22 to and from positions for transferring resin from the resin receptacles 20, or for receiving transferred resin into a component core 22.

Figure 4:
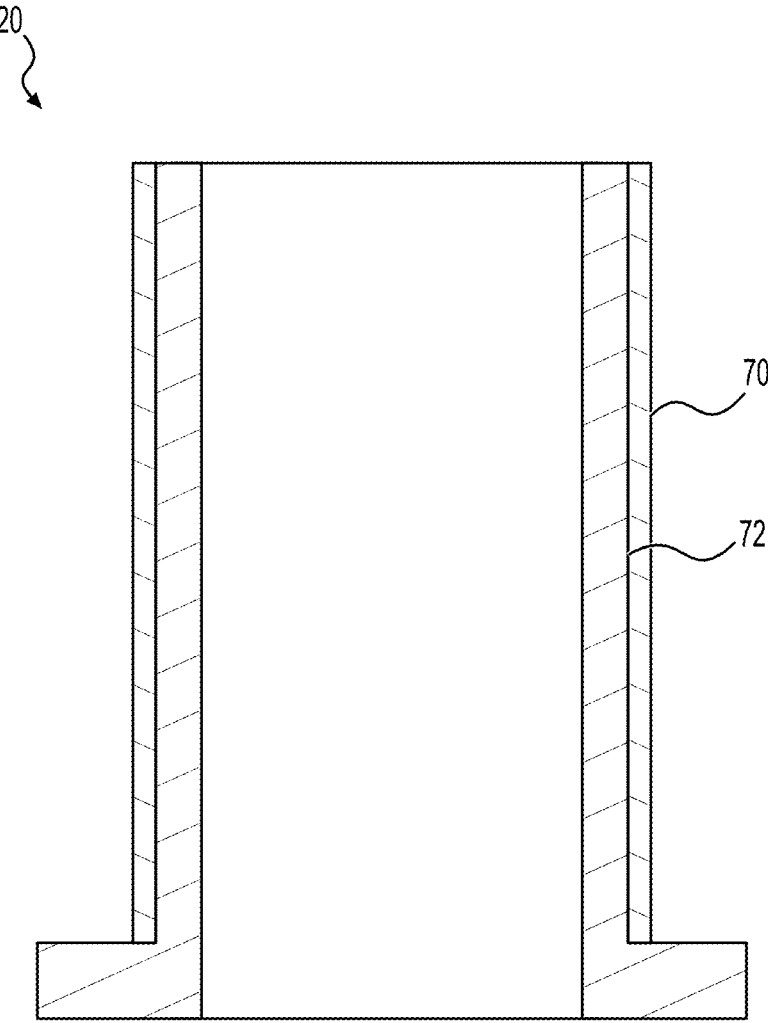
FIG. 4 is a schematic cross-sectional view depicting an exemplary resin receptacle in accordance with the principles of the present disclosure.

In one embodiment, one or more of the resin receptacles 20 may be controllably heated by heating devices 70 associated with the respective resin receptacles 20 and config-
ured to heat resin material 62 received within the resin
receptacles 20. Use of the heating devices 70 to heat the
resin receptacles 20 facilitates keeping the structure of the
transfer molding system 10 warm during operation, which
helps the system 10 to maintain more uniform temperatures
and, as a result, shorten cycles times for transfer molding.
With reference to FIG. 4, an exemplary resin receptacle 20
in the form of a resin pot includes a band heater 70
operatively coupled with an outer circumferential wall 72 of
the resin pot. The band heater 70 may be a mica band heater
available from DME Company of Madison Heights, MI., for
example. In one embodiment, the band heater 70 may be
controlled to heat the resin material 62 within its respective
resin pot 20 to a temperature in the range of about 180
degrees Celsius as the resin support 18 moves the resin pot
20 toward the first position 26 for engagement with the first
actuator 28. In one aspect, the band heater 70 may heat the
resin material 62 from a solid phase to a so-called "jelly"
phase, distinct from a less viscous liquid phase, as the resin
pot 20 is moved toward the first position 26. In this embodi-
ment, the "jelly" phase may be maintained by selective
control of the band heater 70 until actuation of the first
actuator 28 to engage the resin pot 20 and force the resin 62
contained therein into the transfer manifold 32 causes the
resin material 62 to liquefy, which facilitates transferring the
resin material 62 from the resin pot 20, through the transfer
manifold 32, and into a component core 22.

Figure 2D:
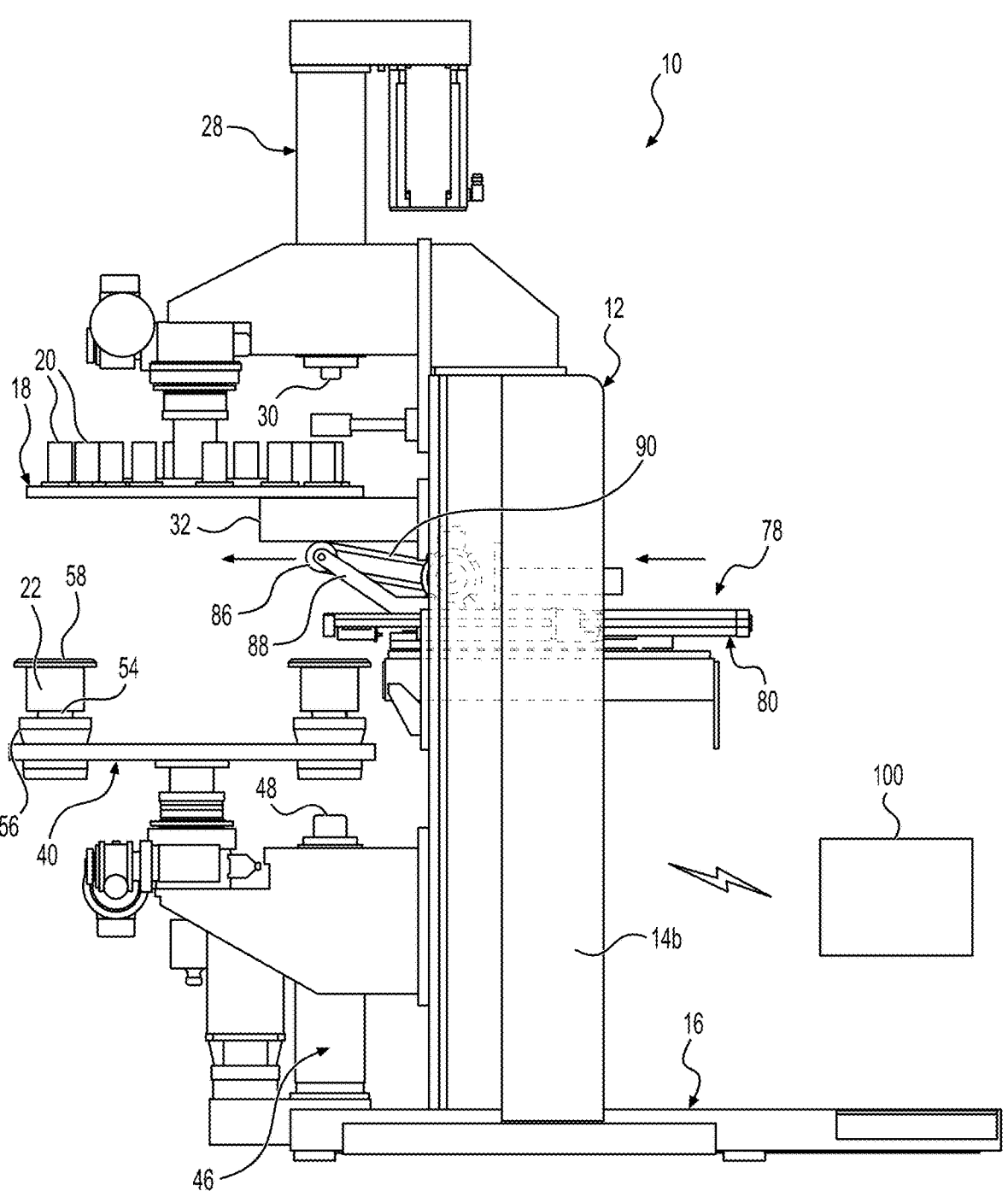
FIG. 2D is a side elevation view of the transfer molding system of FIG. 1, illustrating a cleaning operation of the transfer molding system.

In another embodiment, the transfer molding system 10
may further include structure or devices configured to clean
the transfer manifold 32 from debris that may accumulate
during the resin transfer process. In the embodiment shown,
the transfer molding system 10 includes a vacuum assembly
78 supported on the frame 12 near the transfer manifold 32.
The vacuum assembly 78 is supported on a slide assembly
80 coupled with the frame 12, whereby the vacuum assem-
bly 78 may be moved from a first position 82 spaced away
from the transfer manifold 32 (FIG. 2C), to a second position
84 for operative engagement with the transfer manifold 32
(FIG. 2D) so that a surface 60 of the transfer manifold 32
surrounding the at least one outlet 34 may be cleaned of
debris, such as excess resin material resulting from filling
the core components 22. The vacuum assembly 78 may
comprise a Dayton 3-HP industrial vacuum pump available
from Grainger, Inc. of Madison Heights, MI, and the slide
assembly 80 may comprise Model DSBC-50 ISO Cylinders
available from Festo Corp. of Troy, MI, for example. In use,
the vacuum assembly 78 is operated to create a vacuum
pressure at least when the vacuum assembly 78 is moved to
the second position, which vacuum pressure collects excess
resin material or other debris that may be present on the
transfer manifold 32.

In one embodiment, the vacuum assembly 78 may further
include a brush 86 positioned and arranged to engage and
clean the surface 60 of the transfer manifold 32 proximate
the at least one outlet 34 as the vacuum assembly 78 moves
between the first and second positions 82, 84. Advanta-
geously, debris that is cleaned from the transfer manifold 32
by the brush 86 may be entrained by the vacuum pressure to
facilitate removal. In the embodiment shown, the brush 86
is a cylindrically-shaped bristle brush that is rotatably sup-
ported on the vacuum assembly 78 by a brush arm 88 for
engagement with a lower surface 60 of the transfer manifold
32. A belt 90 coupled with the brush 86 may be driven by a
motor to rotate the brush 86 as the vacuum assembly 78 moves between the first and second positions 82, 84,
enhancing the ability of the brush 86 to clean debris from the
transfer manifold 32.

In one embodiment, the transfer molding system may
further include structure or devices configured to clean the
first piston 30 after the first piston 30 has engaged a resin
receptacle 20 at the first position 26 to force resin material
62 therefrom. In the embodiment shown, the transfer mold-
ing system 10 further includes an annular-shaped piston
cleaning device 94 cantilevered from the frame 12 by an arm
member 96 such that the piston cleaning device 94 is
positioned between the first actuator 28 and a resin recep-
tacle 20 at the first position 26 of the resin support 18. The
piston cleaning device 94 includes a bore 98 extending
therethrough and aligned with the first piston 30. As the first
piston 30 extends to engage a resin receptacle 20, it passes
through the bore 98 of the piston cleaning device 94. When
the first piston 30 is then retracted after forcing resin 62 from
the resin receptacle 20 at the first position 26, the first piston
30 is drawn back through the bore 98, whereby any excess
resin or other debris that might remain on the first piston 30
is wiped from the surface of the first piston 30. While the
piston cleaning device 94 has been shown and described
herein in the form of an annular member having a bore 98
therethrough, it will be appreciated that various other struc-
ture or devices may alternatively be used to clean resin or
debris from the first piston 30.

The transfer molding system may further include a con-
troller 100 configured to control operation of the system 10
to transfer resin material 62 into component cores 22 as
described above. Accordingly, the controller 100 may com-
municate directly or indirectly with one or more of the first
and second actuators 28, 46, the resin support 18, the core
support 40, the transfer manifold 32, or the vacuum assem-
bly 78 to coordinate operation of these devices to fill
component cores 22 as described above. The controller 100
may also be configured to receive signals or information
from sensors associated with the various devices or other
components of the transfer molding system 10 for use in
controlling operation of the transfer molding system 10, or
for data logging purposes. While the exemplary transfer
molding system 10 is shown and described herein with a
single controller 100, it will be appreciated that the system
10 may include additional controllers or computers as may
be desired or suitable for controlling operation of the system
10 as described above.

While the present invention has been illustrated by a
description of various embodiments, and while these
embodiments have been described in considerable detail, it
is not intended to restrict or in any way limit the scope of the
appended claims to such de-tail. The various features shown
and described herein may be used alone or in any combi-
nation. Additional advantages and modifications will readily
appear to those skilled in the art. The invention in its broader
aspects is therefore not limited to the specific details, rep-
resentative apparatus and methods, and illustrative examples
shown and described. Accordingly, departures may be made
from such details without departing from the spirit and scope
of the general inventive concept.

What is claimed is:
1. A transfer molding system, comprising:
a first actuator for transferring molten resin to a compo-
nent core;
a resin support supporting a plurality of resin receptacles
and configured to selectively move the respective resin
receptacles to and from a first position for operative engagement with the first actuator, and at least one second position displaced away from the first position;

a transfer manifold adjacent the resin support and adapted to receive resin from a resin receptacle located at the first position when the first actuator is actuated to operatively engage the resin receptacle, the transfer manifold having at least one outlet for dispensing resin therefrom;

a core support proximate the transfer manifold and supporting at least two component cores for movement to and from a first index location wherein the respective component core is aligned with the at least one outlet of the transfer manifold, and at least one second index location wherein the component core is displaced away from the first index location for handling or processing; and a second actuator aligned with the first index location of the core support, the second actuator operative to move a respective component core at the first index location from a first position supported on the core support, to a second position raised from the core support and in operative engagement with the at least one outlet of the transfer manifold, whereby resin may be transferred from the transfer manifold into the component core.

2. The transfer molding system of claim 1, wherein at least one of the resin support or the core support is configured as a rotationally indexable table.

3. The transfer molding system of claim 1, wherein the plurality of resin receptacles each comprise a resin pot on the resin support.

4. The transfer molding system of claim 1, wherein each resin receptacle includes an associated heating device configured to heat resin within the receptacle.

5. The transfer molding system of claim 4, wherein at least one heating device comprises a heating band coupled with the respective resin receptacle.

6. The transfer molding system of claim 1, further comprising:

a vacuum assembly proximate the transfer manifold;

the vacuum assembly movable from a first position spaced away from the transfer manifold, to a second position for operative engagement with the transfer manifold;

the vacuum assembly configured to remove excess resin from a surface of the transfer manifold at least when the vacuum assembly is in the second position.

7. The transfer molding system of claim 6, wherein the vacuum assembly includes a brush positioned and arranged to clean a surface of the manifold proximate the outlet as the vacuum assembly moves between the first and second positions.

* * * * *